Nov. 22, 1960     L. M. JONES     2,960,872
TRANSIT-TIME ACCELEROMETER
Filed May 10, 1957

INVENTOR.
LESLIE M. JONES
BY Wade Loomis
Martin J. Finnegan
ATTORNEYS

United States Patent Office 2,960,872
Patented Nov. 22, 1960

2,960,872

TRANSIT-TIME ACCELEROMETER

Leslie M. Jones, Ann Arbor, Mich., assignor to the United States of America as represented by the Secretary of the Air Force Filed May 10, 1957, Ser. No. 658,475

3 Claims. (Cl. 73—517)

This invention relates generally to accelerometers of the transit-time variety and particularly to the suspended mass and release mechanism component thereof.

Conventional accelerometers usually employ a spring-mass combination. The main disadvantages of this type are their unidirectional sensitivity and restricted range. Transit-time accelerometers have been tried, but are not found in use. Their disadvantages are unidirectional response and the necessity of measuring initial velocity.

It is, therefore, an object of this invention to provide an accelerometer which will measure linear acceleration in any direction.

Another object of this invention is to provide an accelerometer which can make accurate measurements of acceleration independent of the orientation of the device.

It is also an object of this invention to provide an accelerometer that will accurately measure accelerations as small as $0.01\ g$ where $g$ is the acceleration due to gravity.

These and other advantages, features and objects of the invention will become more apparent from the following description taken in connection with the illustrative embodiments in the accompanying drawings, wherein.

Figure 3:
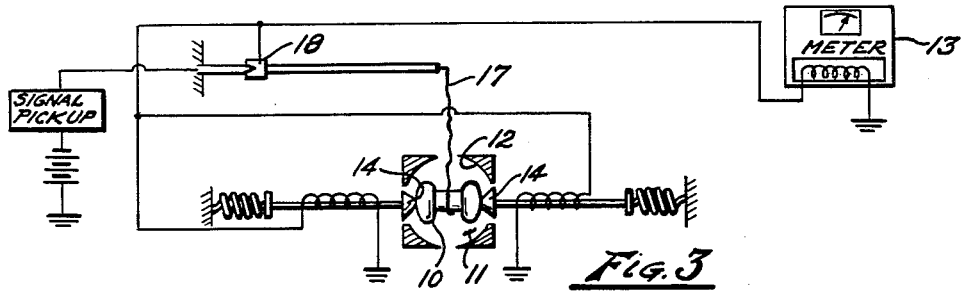
Fig. 3 is a schematic of the associated circuitry.
Figure 1:
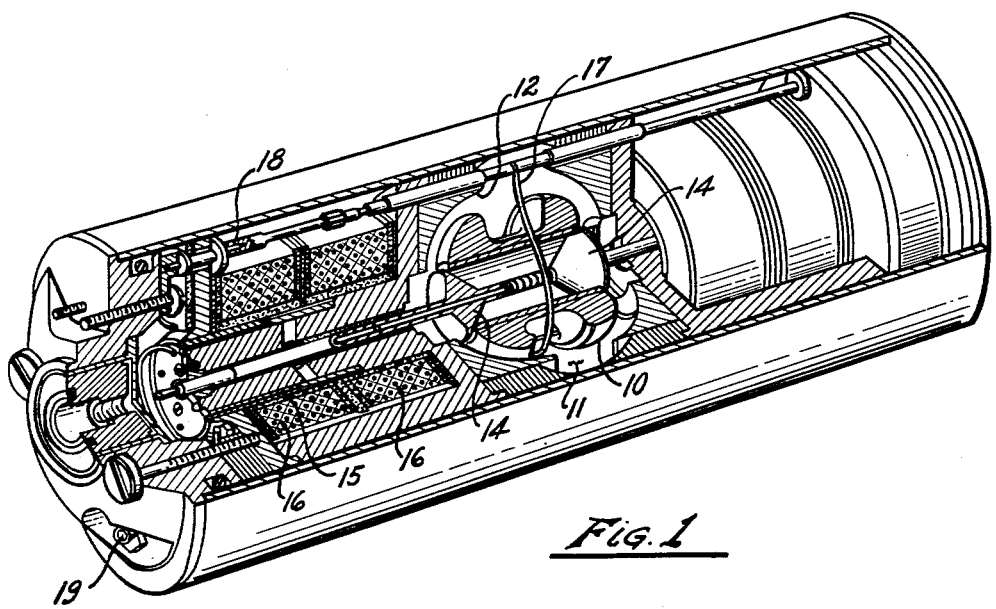
Fig. 1 is the accelerometer unit partly in cross-section.
Figure 2:
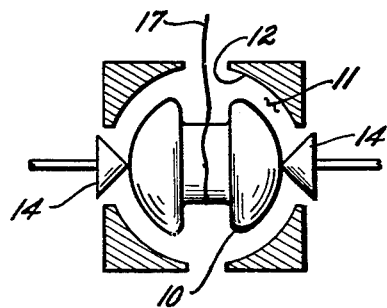
Fig. 2 shows a cavity with a small mass suspended therein.

As will be clear from the drawings, a small mass or bobbin 10 is caged in the center of a cavity 11. The bobbin 10 and cavity 11 are so shaped that the distance from the periphery of bobbin 10 to the first point of contact anywhere on the cavity wall 12 is the same in all directions. When making an acceleration measurement the bobbin 10 is released and travels toward the cavity 12 in an interval of time $t$ which is a function of the travel distance $s$ and the acceleration $a$ of the accelerometer such that $s = \frac{1}{2}at^2$. The distance $s$ is constant and the time of travel of the bobbin is most conveniently measured by an electronic time-interval meter schematically represented at 13 in Fig. 3. Utilizing the transit-time as registered on meter 13 it is an easy matter to determine the acceleration, by simply applying the formula just referred to. If it is further desired to break down the derived acceleration value into its two components, namely, (1) acceleration due to gravity, and (2) imposed acceleration, it is only necessary to add to or subtract from the acceleration value, as derived from the transit-time reading, the known gravity-induced portion of the total acceleration. Acceleration due to gravity is, of course, a known constant, and can be added or subtracted, as required, depending upon whether the vertical component of the motion is in the downward or upward direction.

In a device of this character it is important that virtually no initial velocity be imparted to the bobbin or release. This is accomplished by the simultaneous withdrawal of the conical pickup fingers 14. These are actuated electromagnetically in the withdrawing direction, through the instrumentality magnetic field 16 and moving coils 15 which are fixed to the shaft-like extensions of the conical pickup fingers 14. When bobbin 10 reaches cavity wall 12 bobbin contact wire 17 opens switch 18 terminating the signal to time-interval meter 13. The opening of switch 18 also de-energizes field 16, permitting fingers 14 to resume centering engagement with bobbin 10, thus restoring the parts to the initial setting, thereby completing the cycle.

Sensitivity is improved by evacuation of the unit at valve 19. Other variations in construction are possible, for example, the geometrical dimensions can be changed to change the range of operation. Also, different caging systems using permanent magnets are possible.

Although the invention has been described with reference to particular embodiments it will be understood to those skilled in the art that the invention is capable of a variety of alternative embodiments within the spirit and scope of the appended claims.

What is claimed is:

1. An accelerometer comprising a cavity, a mass rigidly suspended within said cavity in such manner that the periphery of said mass is equidistant at all points from the wall of said cavity, means for releasing said mass without imparting initial velocity thereto, and means for measuring the time interval between release of said mass and contact of said mass with the wall of said cavity.

2. An accelerometer comprising a generally spherical cavity, a mass disposed within said cavity, means for holding said mass centered within said cavity, said means including two conical elements engaging opposite ends of said mass, means for withdrawing said conical elements to release said mass, and means for measuring the time interval between release of said mass and contact of said mass with the wall of said cavity.

3. An accelerometer as described in claim 2 wherein said withdrawing means includes shaft-like extensions of said conical elements and electromagnetic means for imparting longitudinal movement to said extensions.

References Cited in the file of this patent

UNITED STATES PATENTS

| | | |
|---|---|---|
| 2,137,963 | Heiland | Nov. 22, 1938 |
| 2,641,458 | Gilvarry et al. | June 9, 1953 |